March 20, 1956 V. J. McCARTHY 2,738,965
BORING HEAD WITH BREAKER DEVICE FOR MINING MACHINES
Filed Aug. 21, 1953 2 Sheets-Sheet 1
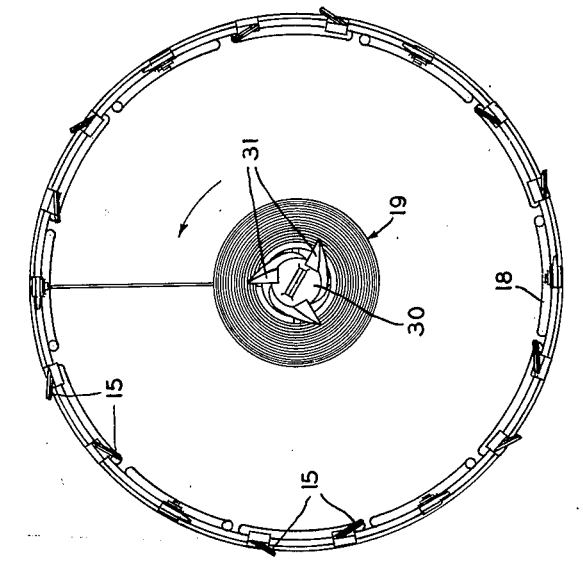
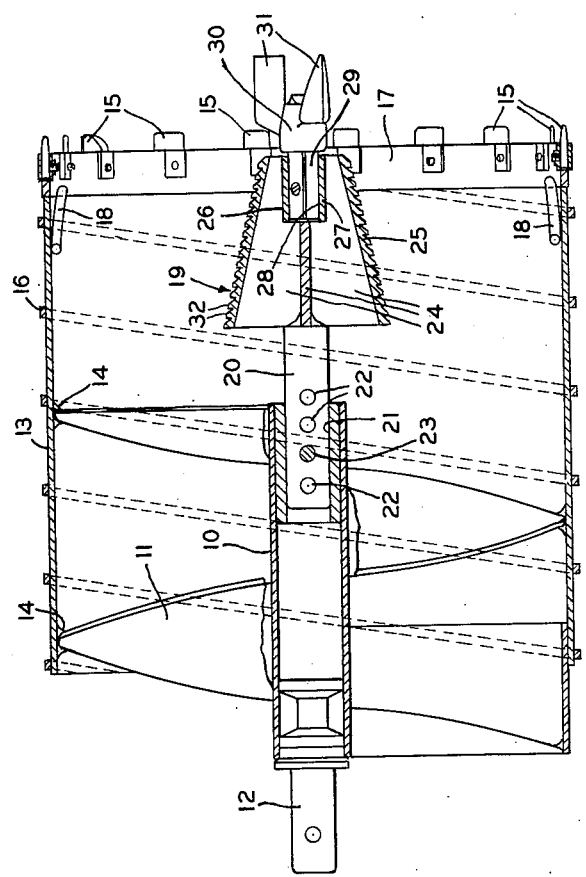
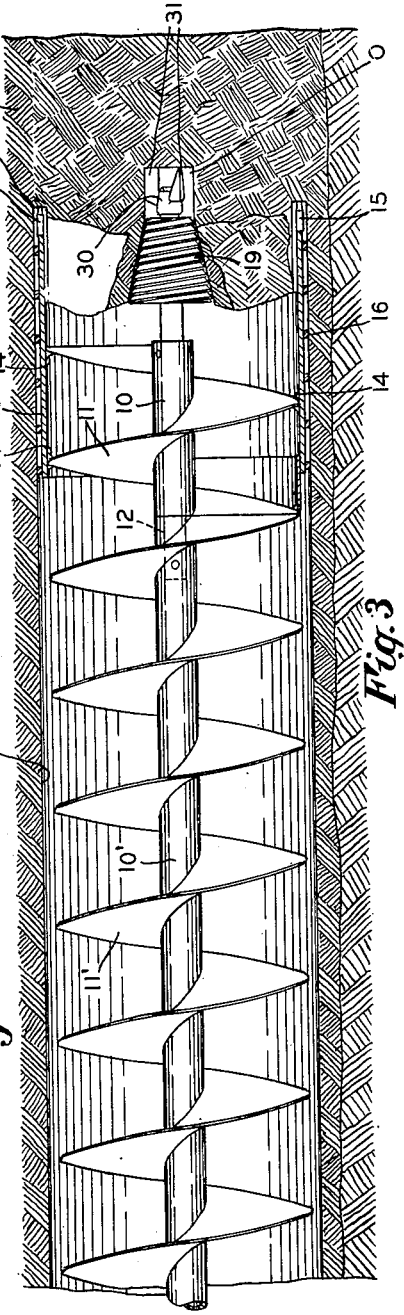
INVENTOR.
Vincent J. McCarthy
BY
Frease & Bishop
ATTORNEYS March 20, 1956 V. J. McCARTHY 2,738,965
BORING HEAD WITH BREAKER DEVICE FOR MINING MACHINES
Filed Aug. 21, 1953 2 Sheets-Sheet 2

INVENTOR.
Vincent J. McCarthy
BY Frease & Bishop
ATTORNEYS

United States Patent Office 2,738,965
Patented Mar. 20, 1956

2,738,965
BORING HEAD WITH BREAKER DEVICE FOR MINING MACHINES

Vincent J. McCarthy, Youngstown, Ohio, assignor to The Salem Tool Company, Salem, Ohio, an Ohio corporation Application August 21, 1953, Serial No. 375,729

6 Claims. (Cl. 262—9)

The invention relates to the mining of coal and other minerals, and more particularly to a boring head of the general type of Joy Patent No. 1,445,085 dated February 13, 1923, comprising generally a tubular cylinder adapted to be rotated by a mining machine and having a conical breaker therein for bursting the cylindrical core of coal cut by the tubular cylinder.

In the Joy patent referred to the conical breaker is a solid cone having a relatively slight taper. Such a construction does not provide adequate means for quickly carrying away the chips and cuttings produced by the inner cutting means at the forward end of the conical breaker.

It is an object of the invention to improve such structures by providing a boring head of the character referred to having a conical breaker provided with longitudinal passages therethrough for quickly and readily carrying away cuttings and borings produced by the inner cutting means.

Another object is to provide such a breaker comprising a plurality of radially disposed, tapered plates surrounded by a hollow cone.

A further object is to provide such a breaker having a double screw thread upon its exterior for boring into and bursting the core of coal cut by the cutting means at the leading edge of the tubular cylinder.

A still further object is to provide such a conical breaker with radially disposed horns or arms at its larger end to assist in breaking extremely large lumps of coal into sufficiently small size for commercial use.

Figure 4:
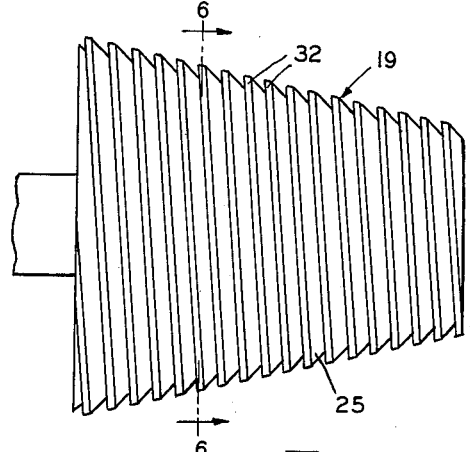
Figure 5:
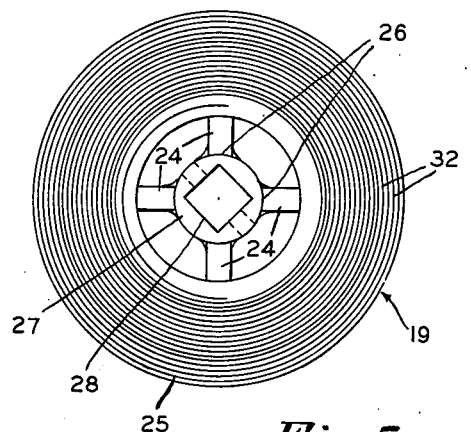
Figure 7:
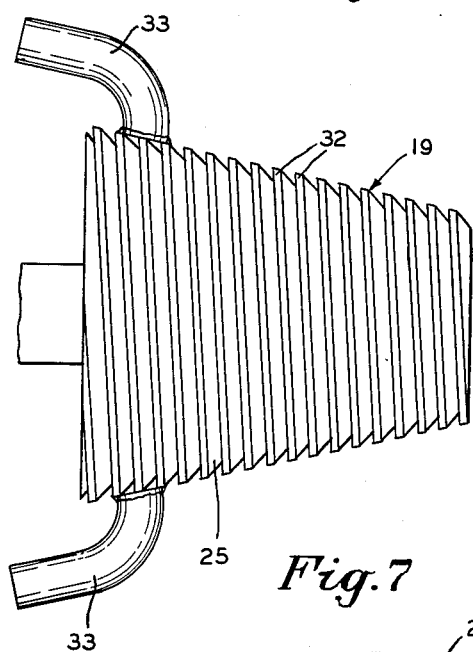
Figure 8:
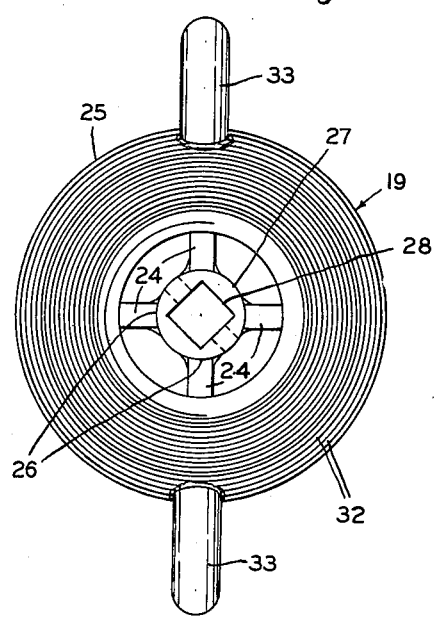
Figure 6:
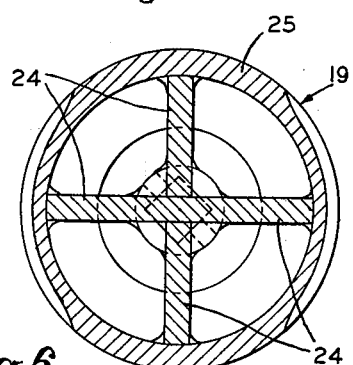

The above objects together with others which will be apparent from the drawings and following description, or which may be later referred to, may be attained by constructing the improved boring head in the manner hereinafter described in detail, and illustrated in the accompanying drawings, in which:

Fig. 1 is a longitudinal sectional view through a boring head embodying the invention;

Fig. 2 a front elevation of the head;

Fig. 3 a vertical sectional view through a coal seam showing the improved boring head in operation therein;

Fig. 4 an enlarged side elevation of the conical breaker;

Fig. 5 a front elevation of the breaker shown in Fig. 4;

Fig. 6 a transverse sectional view through the breaker, taken on the line 6—6, Fig. 4;

Fig. 7 a view similar to Fig. 4 showing the breaker provided with radially disposed rigid horns or arms; and, Fig. 8 a front elevation of the breaker shown in Fig. 7.

Referring now more particularly to the embodiment of the invention illustrated, in which similar numerals refer to similar parts throughout, the improved boring head to which the invention relates is adapted to be associated with an auger of conventional design and relatively large diameter, adapted to be simultaneously rotated and advanced into a coal seam by a suitable mining machine.

A conventional auger, which may be any desired size, usually from 20 inches to 60 inches in diameter, as shown in Fig. 1, may comprise the usual tubular shaft 10 surrounded by a spiral flight or vane 11 and having the conventional squared shank 12 at its rear end for engagement in a squared socket of a similar auger section, as in usual practice.

In producing the boring head to which the invention pertains, a tubular cylinder 13 is located around the vane or flight 11, being rigidly attached thereto as by welding or the like, as indicated at 14, this cylinder preferably extending forwardly some distance beyond the end of the shaft 10 and spiral vane 11, as shown in Figs. 1 and 2.

At the forward end of the tubular cylinder 13 usual cutting means are provided, comprising a plurality of cutting bits 15. These bits are preferably located at various angles, as best shown in Fig. 2, so that the circular kerf or groove cut thereby into a coal seam, or other mineral being mined, is of greater width than the wall thickness of the cylinder 13.

A spiral rib 16 may be located around the exterior of the cylinder 13 for conveying chips and dust produced by the cutting bits 15 rearwardly along the outside of the cylinder as it rotates and advances into the coal seam.

As best shown in Fig. 1 the bits 15 may be mounted upon a ring 17 of heavier construction than the cylinder 13, welded or otherwise rigidly attached to the forward end of the cylinder. To assist in attaching this ring to the cylinder, spiral or angular ribs 18 may be welded or otherwise attached to the interior of the cylinder and the ring as shown in Fig. 1.

These ribs may cooperate with the conical breaker as will be later described, in breaking the cylindrical core of coal, cut by the bits 15, into lumps and assist in conveying the lumps rearwardly to the spiral flight or vane 11.

The conical breaker, indicated generally at 19, is located at the forward end of the shaft 10 to which it is adapted to be detachably connected in adjusted position by means of the rearwardly disposed squared shank 20 for engagement in the squared socket 21 at the forward end of the shaft. The shank 20 is provided with a plurality of spaced apertures 22 adapted to be selectively engaged by a pin 23 located through a radial opening in the shaft 10.

The breaker 19 as shown in the drawings may comprise a plurality of radially disposed, tapered plates 24 welded or otherwise rigidly attached together and having the hollow truncated cone 25 surrounding and attached to the blades as by welding or the like.

The shank 20 is axially disposed relative to the conical breaker and welded or otherwise rigidly connected to the rear ends of the plates 24. The forward end portions of the plates 24 are cut out as indicated at 26 to receive the socket member 27 which is welded or otherwise connected thereto and provided with a squared socket 28.

This socket is adapted to receive the squared shank 29 of the inner or central cutting means 30 which carries a plurality of cutting bits 31 adapted to cut an opening into the coal seam at least as large in diameter as the forward or smaller end of the conical breaker 19.

For the purpose of assisting in advancing the conical breaker into the coal seam, a double screw thread, as indicated at 32, is formed around the exterior of the truncated cone 25. This thread is preferably of the form of a wood screw as best shown in Figs. 4 and 7 to cause it to bite into the coal seam, as the breaker is rotated and advanced therein.

In the operation of the boring head above described, a conventional auger section, comprising the usual shaft 10' and spiral flight or vane 11', is attached at its forward end to the shank 12 of the boring head and at its rear end to the driving means of any suitable boring machine by means of which the mining assembly of auger and boring head may be simultaneously rotated and advanced into a seam of coal or other mineral to be mined, as indicated at C in Fig. 3.

As the boring head is thus rotated and advanced into the coal seam the peripheral cutting bits 15 at the forward end of the tubular cylinder 13 will cut a circular kerf or groove in the coal seam, as indicated at K in Fig. 3, producing a cylindrical core of coal.

The bits 31 of the inner or central cutting means will cut a central opening O into the coal seam as the head is rotated and advanced and the forward or smaller end of the conical breaker 19 will enter this opening, the double thread 32 thereon assisting in advancing the conical breaker into this opening.

The conical breaker will thus exert outward radial pressure within the opening, breaking the core of coal into blocks which will be carried back through the auger flights 11 and 11' in usual and well known manner to the outer end of the hole H which is bored into the coal seam.

As each auger section advances substantially its full length into the hole, another auger section may be interposed between the same and the boring machine, as many auger sections as required being successively added to the mining assembly depending upon the depth it may be desired to mine into the coal seam.

In the event that the tubular cylinder 13 is of extremely large diameter, relative to the conical breaker, it will be seen that because of the distance between the exterior of the conical breaker and the interior of the tubular cylinder, the lumps of coal produced by this head would be very large in some cases of greater size and width than desirable or convenient for commercial use.

In order to break such extremely large lumps of coal into smaller lumps of suitable commercial size, radially and rearwardly disposed rigid horns or arms 33 may be welded or otherwise rigidly secured to the rear or larger end portion of the truncated cone 25, as shown in Figs. 7 and 8, these horns rotating and advancing with the breaker and functioning to further break the coal into lumps of size suitable for commercial use.

Otherwise the construction and operation will be the same as above described and it will be seen that whether or not the horns or arms 33 are used the improved boring head will operate to break the coal or other mineral being mined into lumps and convey them rearwardly out of the hole as the mining assembly advances therein.

It will be evident that any chips or cuttings of coal produced by the bits 31 of the inner cutting means, which are not quickly disposed of by dropping into the lower portion of the tubular cylinder between the lumps of coal as they are broken by the conical breaker, may pass longitudinally through the conical breaker within the hollow truncated cone 25 and between the plates 24 thereof so as not to impede the operation.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful constructions, and reasonable mechanical equivalents thereof obvious to those skilled in the art, are set forth in the appended claims.

I claim:

1. An auger boring head comprising a rotatable and advanceable tubular cylinder, peripheral cutting means at the forward edge of the tubular cylinder for cutting a cylindrical kerf into a seam of coal and the like upon rotation and advancement of the cylinder, a breaker within the cylinder comprising an axially located truncated cone, there being a longitudinal passage extending entirely through said cone, inner cutting means located at the forward end of the breaker, a radially disposed rigid horn upon the rear portion of the cone, extending outwardly and rearwardly therefrom the forward end of said cone being small enough to enter the opening formed by the inner cutting means, the rear end of the cone being larger than said opening, and a spiral auger located within the cylinder in the rear of the breaker.

2. An auger boring head comprising a rotatable and advanceable tubular cylinder, peripheral cutting means at the forward edge of the tubular cylinder for cutting a cylindrical kerf into a seam of coal and the like upon rotation and advancement of the cylinder, a breaker within the cylinder comprising an axially located truncated cone, there being a longitudinal passage extending entirely through said cone, a double screw thread upon the exterior of said cone, inner cutting means located at the forward end of the breaker, a radially disposed rigid horn upon the rear portion of the cone, extending outwardly and rearwardly therefrom the forward end of said cone being small enough to enter the opening formed by the inner cutting means, the rear end of the cone being larger than said opening, and a spiral auger located within the cylinder in the rear of the breaker.

3. An auger boring head comprising a rotatable and advanceable tubular cylinder, peripheral cutting means at the forward edge of the tubular cylinder for cutting a cylindrical kerf into a seam of coal and the like upon rotation and advancement of the cylinder, a breaker within the cylinder comprising an axially located truncated cone, there being a longitudinal passage extending entirely through said cone, a double screw thread of the wood screw type upon the exterior of said cone, inner cutting means located at the forward end of the breaker, a radially disposed rigid horn upon the rear portion of the cone, extending outwardly and rearwardly therefrom the forward end of said cone being small enough to enter the opening formed by the inner cutting means, the rear end of the cone being larger than said opening, and a spiral auger located within the cylinder in the rear of the breaker.

4. An auger boring head comprising a rotatable and advanceable tubular cylinder, peripheral cutting means at the forward edge of the tubular cylinder for cutting a cylindrical kerf into a seam of coal and the like upon rotation and advancement of the cylinder, a breaker within the cylinder comprising an axially located truncated cone, inner cutting means located at the forward end of the breaker, a radially disposed rigid horn upon the rear portion of the cone, extending outwardly and rearwardly therefrom the forward end of said cone being small enough to enter the opening formed by the inner cutting means, the rear end of the cone being larger than said opening, and a spiral auger located within the cylinder in the rear of the breaker.

5. An auger boring head comprising a rotatable and advanceable tubular cylinder, peripheral cutting means at the forward edge of the tubular cylinder for cutting a cylindrical kerf into a seam of coal and the like upon rotation and advancement of the cylinder, a breaker within the cylinder comprising an axially located truncated cone, a double screw thread of the wood screw type upon the exterior of said cone, inner cutting means located at the forward end of the breaker, a radially disposed rigid horn upon the rear portion of the cone, extending outwardly and rearwardly therefrom the forward end of said cone being small enough to enter the opening formed by the inner cutting means, the rear end of the cone being larger than said opening, and a spiral auger located within the cylinder in the rear of the breaker.

6. An auger boring head comprising a rotatable and advanceable tubular cylinder, peripheral cutting means at the forward edge of the tubular cylinder for cutting a cylindrical kerf into a seam of coal and the like upon rotation and advancement of the cylinder, a breaker within the cylinder comprising a plurality of tapered radially disposed plates, a hollow truncated cone surrounding and attached to said plates, said cone being open at both ends providing a plurality of longitudinal passages extending entirely therethrough inner cutting means located at the forward end of the breaker, the forward end of said cone being small enough to enter the opening formed by the inner cutting means, the rear end of the cone being larger than said opening, and a spiral auger located within the cylinder in the rear of the breaker, and a radially disposed rigid horn upon the rear portion of the cone extending outwardly and rearwardly therefrom.

References Cited in the file of this patent

UNITED STATES PATENTS

| | | |
|---|---|---|
| 1,273,869 | Joy | July 30, 1918 |
| 1,445,085 | Joy | Feb. 13, 1923 |
| 2,562,841 | Compton | July 31, 1951 |
| 2,579,712 | Tilden | Dec. 25, 1951 |

FOREIGN PATENTS

| | | |
|---|---|---|
| 129,935 | Great Britain | Dec. 5, 1918 |
| 812,906 | Germany | Sept. 6, 1951 |